United States Patent
Hino et al.

(10) Patent No.: US 9,322,541 B2
(45) Date of Patent: Apr. 26, 2016

(54) COOLING STRUCTURE

(71) Applicant: Panasonic Intellectual Property Management Co., Ltd., Osaka (JP)

(72) Inventors: Hirohisa Hino, Osaka (JP); Arata Kishi, Osaka (JP); Honami Nawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 31 days.

(21) Appl. No.: 14/569,045

(22) Filed: Dec. 12, 2014

(65) Prior Publication Data
US 2015/0180099 A1 Jun. 25, 2015

(30) Foreign Application Priority Data
Dec. 25, 2013 (JP) ................................. 2013-266801

(51) Int. Cl.
| | |
|---|---|
| *H01M 10/50* | (2006.01) |
| *F21V 29/15* | (2015.01) |
| *H01M 10/653* | (2014.01) |
| *H01M 10/6551* | (2014.01) |
| *H01M 10/655* | (2014.01) |
| *H01M 10/613* | (2014.01) |
| *H01M 10/66* | (2014.01) |
| *H01M 4/86* | (2006.01) |

(52) U.S. Cl.
CPC .............. *F21V 29/15* (2015.01); *H01M 10/613* (2015.04); *H01M 10/653* (2015.04); *H01M 10/655* (2015.04); *H01M 10/6551* (2015.04); *H01M 4/8642* (2013.01); *H01M 10/66* (2015.04)

(58) Field of Classification Search
CPC ... F21V 29/15; H01M 10/613; H01M 10/653; H01M 10/655; H01M 10/6551
See application file for complete search history.

(56) References Cited

U.S. PATENT DOCUMENTS

2005/0139256 A1* 6/2005 Korman ................ H01L 31/042
136/256
2008/0057325 A1 3/2008 Sakurai et al.

FOREIGN PATENT DOCUMENTS

JP 4514058 B 7/2010

* cited by examiner

*Primary Examiner* — Patrick Ryan
*Assistant Examiner* — Ben Lewis
(74) *Attorney, Agent, or Firm* — Panasonic Patent Center

(57) ABSTRACT

A cooling structure can efficiently reduce heat, thereby suppressing temperature elevation in heat-producing electronic apparatuses, without using a heat sink or water-cooling jacket, and which can achieve their downsizing or weight reduction. The cooling structure includes: a heat conduction layer which is formed by coating a first paste on a surface of a heat-producing object; and a heat radiation layer which is formed by coating a second paste on a surface of the heat conduction layer. The heat conduction layer includes a first resin and a first filler, and a heat conductivity λ of the heat conduction layer is 1.0 W/(m·K) or more. The heat radiation layer includes a second resin and a second filler, and an infrared emissivity ε of the heat radiation layer is 0.7 or more.

17 Claims, 6 Drawing Sheets

Related Art

COOLING STRUCTURE

BACKGROUND OF THE INVENTION

1. Technical Field

The technical field relates to a cooling structure in which a heat-releasing resin composition is provided on the surface of a heat-producing object.

2. Description of Related Art

Mobile electronic apparatuses typified by recent smart phones and tablet terminals have been likely to produce heat due to acceleration of the speed of CPUs. For cooling of heat-producing electronic apparatuses, a cooling method in which a fan is turned to feed the air thereto, and the heat is released from a heat sink by convection, has generally been adopted.

SUMMARY OF THE INVENTION

Silicone grease or the like having superior heat conductance has been used in a part which connects a heat-producing device and a heat sink (see Japanese Patent No. 4,514,058). However, it is difficult to provide a fan and a heat sink in small, lightweight and thin smart phones or tablet terminals, because of their thin, lightweight structures and functions. Therefore, in recent years, their heat radiation has gained prominent attention as a major problem.

As for a measure to prevent temperature elevation in a heat-producing electronic apparatus, the heat is generally transmitted to a heat sink or water-cooling jacket via a material having superior heat conductance such as heat-conductive silicone grease, thereby cooling the apparatus. However, when air-cooling the apparatus with a heat sink, a fan for feeding the air thereto is required. Additionally, a power for turning the fan is also required. Also, when using a water-cooling jacket, the apparatus would be a large scale apparatus. Consequently, there has been a tendency that such a large scale apparatus is contrary to the recent trend of light, thin, short and small bodies as well as cost reduction.

In order to solve the above-described problem, as well as other concerns, a cooling structure according to a first aspect includes: a heat conduction layer which is formed by coating a first paste on a surface of a heat-producing object; and a heat radiation layer which is formed by coating a second paste on a surface of the heat conduction layer, wherein the heat conduction layer includes a first resin and a first filler, and a heat conductivity $\lambda$ of the heat conduction layer is 1.0 W/(m·K) or more, and the heat radiation layer includes a second resin and a second filler, and an infrared emissivity $\epsilon$ of the heat radiation layer is 0.7 or more.

According to the coating structure having heat-releasing properties according to the first aspect, heat from a heat-producing object is efficiently transmitted to a resin layer including a high heat-conductive filler, and is efficiently directed to a high heat-radiative surface layer which is in contact with the air, and the heat is further efficiently converted to infrared rays through the resin layer, which is the surface layer, including a filler having a high infrared emissivity, thereby radiating the infrared rays to the air. In this way, the heat from the heat-producing object can be reduced, and temperature elevation of the device can be suppressed. In this technique, excellent effects to suppress the temperature elevation can be obtained without provision of a fan or heat sink.

Furthermore, a paste-coated resin cured product has high adhesion strength against a metal which transmits a heat from the heat-producing object, and interface delamination between the substrate and the resin hardly occurs. Therefore, the heat is stably transmitted therein. Additionally, the resin cured product of the infrared radiation layer has high mechanical strength, and therefore, is highly resistant to physical stimuli such as scratching from the outside.

In particular, since the cooling structure has a two-layer structure of pastes, the cooling structure can be adhered tightly to a heat-producing object of any shape. The cooling structure uses resins having high hardness. The cooling structure will be a part of the heat-producing object.

DESCRIPTION OF EMBODIMENTS

Hereinafter, various exemplary embodiments will be described with reference to figures.

(Embodiment 1)

Figure 1:
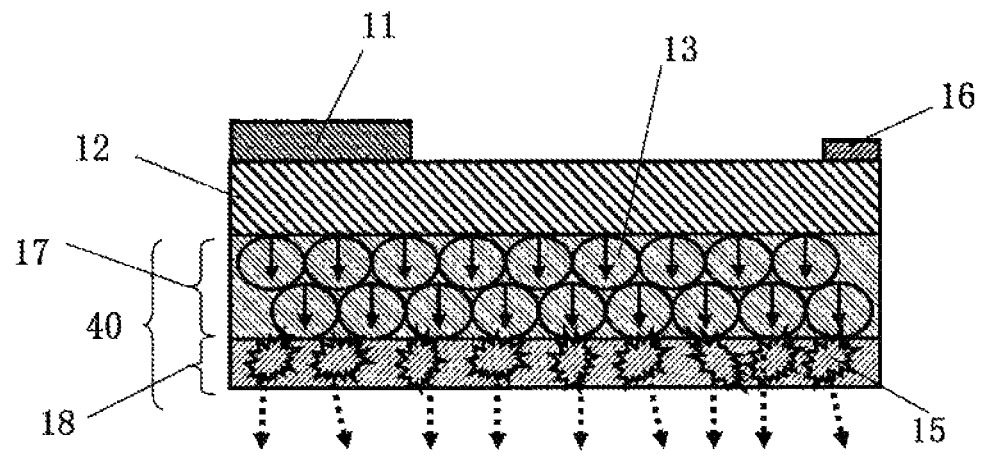
FIG. 1 is a cross-sectional view of an example of a coating structure according to an embodiment.

FIG. 1 is a cross-sectional view of a resin composition according to an exemplary embodiment. A resin composition 40 includes a heat conduction layer 17 and a heat radiation layer 18. A substrate 12, a heat-producing object 11 and a thermocouple 16 are placed on the resin composition 40.

The heat-producing object 11 is an electronic component or the like, and is an object which produces heat. The substrate 12 is a metal substrate or the like. The thermocouple 16 is not a constituent element, and is used for evaluating the resin composition 40. The heat conduction layer 17 and the heat radiation layer 18 are laminated on a face of the substrate 12 different from the face on which the heat-producing object 11 is placed.

<Heat Conduction Layer 17>

The heat conduction layer 17 efficiently directs heat, which is transmitted through the substrate 12 from the heat-producing object 11, to the heat radiation layer 18. The heat conduction layer 17 internally includes a heat-conductive filler 13 which is a filler having a superior heat conductivity.

<Heat-Conductive Filler 13>

The heat-conductive filler 13 can be particles such as of silver, copper, graphite, silicon carbide, aluminum oxide, boron nitride, or aluminum nitride. In particular, since a heat conductivity of aluminum oxide (alumina) is as large as 32 W/mK, excellent heat conductance can be exerted when 40 to 95 vol % of alumina is added to the heat conduction layer 17. Specifically, 90 wt % (73 vol %) of alumina is added thereto, a heat conductivity of the heat conduction layer 17 can be increased to around 3 to 5 W/m·K.

<Heat Radiation Layer 18>

The heat radiation layer 18 efficiently converts the heat, which is transmitted from the heat conduction layer 17, to infrared rays, and radiates the infrared rays to the outside air, thereby reducing thermal energy of the heat-producing object 11 and thus suppressing the temperature elevation. The heat radiation layer 18 includes a heat-radiative filler 15 having a high infrared emissivity.

<Heat-Radiative Filler 15>

For the heat-radiative filler 15, ceramics such as zinc oxide, silicon oxide, magnesium oxide, titanium oxide and iron oxide; natural and artificial minerals such as corundum, cordierite, hydrotalcite, forsterite, steatite, kaolin and mullite; and the like are preferable. As to an infrared emissivity $\epsilon$, that of a black body is maximum, and is 1.0, and those of oxides are 0.7 or more. When the infrared emissivity $\epsilon$ is 0.7 or more, its heat-releasing effects will be exerted.

<Mechanism>

The heat from the heat-producing object 11 is transmitted to the heat conduction layer 17 through the substrate 12, and is radiated from the heat radiation layer 18. Excellent effects to suppress the temperature elevation can be obtained by this structure without providing a fan or heat sink. In addition, the heat radiation by the infrared radiation is efficient when a difference between temperatures of the heat radiation layer 18 and the air satisfies following Formula 1.

A surface temperature of the heat radiation layer 18>an air temperature    (Formula 1)

The larger the temperature difference is, the larger the amount of the infrared radiation is. On the contrary, when the air temperature is higher than the surface temperature, heat absorption occurs.

In addition, effects to suppress the temperature elevation cannot be obtained when the order of disposition of the heat conduction layer 17 and the heat radiation layer 18 is reversed. As for the reason, although the heat from the heat-producing object 11 is transmitted through the substrate 12, when the heat radiation layer 18 is present on a face of the substrate 12, infrared rays caused therefrom are intercepted by the heat conduction layer 17 present on the outer side of the heat radiation layer 18, and, consequently, the infrared rays are not released to the outside. Therefore, the effects to suppress the temperature elevation of the heat-producing object cannot be obtained.

Additionally, a thickness of the heat conduction layer 17 may be uniform. However, since the heat diffusion quantity depends on the thickness of the heat conduction layer 17, it is preferable that the thickness is larger near the heat-producing object 11, while the thickness is smaller in the peripheral parts of the heat-producing object 11. By forming such a gradient of the thickness, the heat from the heat-producing object 11 can efficiently be diffused to the entire coating area. As to the thickness of the heat radiation layer 18, when the thickness is larger, radiation of the infrared rays is intercepted. Therefore, thin and uniform coating is preferable.

<Production Method>

The heat conduction layer 17 is produced from a heat conduction layer paste. The heat radiation layer 18 is produced from a heat radiation layer paste. When the heat conduction layer paste and the heat radiation layer paste are coated and cured, they each turn into the heat conduction layer 17 and the heat radiation layer 18. Each of the pastes has high adhesiveness and physical rigidity. It is required that the heat from the heat-producing object 11 efficiently transmits to the heat conduction layer 17 through the substrate 12. However, the heat does not efficiently transmit thereto if the adhesiveness and the rigidity of the heat conduction layer 17 are weak.

Therefore, it is required that the heat conduction layer paste is a resin having high adhesive strength. As for a resin used as a binder for the heat conduction layer paste, a resin having high adhesiveness, for example, one or more types resins selected from among an epoxy resin, an oxetane resin, a cyanate resin, a resol resin, an acrylic resin and the like, are preferable.

In particular, a liquid epoxy resin and an imidazole-curing system are more preferable because they exhibit excellent adhesion against a metal substrate which serves as the substrate 12. In addition, as to the heat radiation layer paste, the liquid paste is coated onto the substrate by printing or the like, and then, is cured by heat. Therefore, the heat radiation layer paste exhibits high adhesiveness by a curing reaction of a binder resin. In addition, since the heat radiation layer paste is also again cured by heat after being coated thereon, high adhesive strength can be retained in the same manner as the heat conduction layer paste.

In addition, since the heat radiation layer paste forms the heat radiation layer 18 which corresponds to an outermost layer, the heat radiation layer 18 is often influenced by mechanical stimuli (hitting, scraping, tearing, etc.) from the outside. Therefore, in a case where a resin used for the heat radiation layer paste is as soft as a rubber, for example, a problem of breakage of a thin film occurs.

Therefore, it is desirable that the resin used for the heat radiation layer paste is a robust cured product. A resin having high rigidity, for example, one or more types of resins selected from among an acrylic resin, an epoxy resin, an oxetane resin, a cyanate resin, a resol resin and the like, are desirable. In particular, a liquid epoxy resin and an imidazole-curing system are more preferable because even a thin film cured product has high rigidity.

(Comparative Example)

Figure 2:
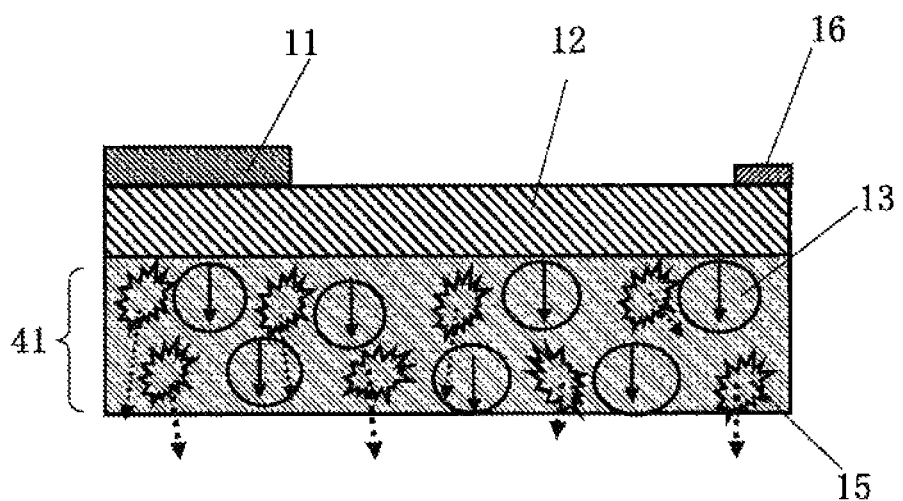
FIG. 2 is a cross-sectional view of an example of a coating structure in a configuration of Comparative Example 1.

A comparative example is shown in FIG. 2. FIG. 2 shows a cross-sectional view of a structure of a resin composition 41 in which a heat-conductive filler 13 and a heat-radiative filler 15 are mixed. Since the heat-conductive filler 13 and the heat-radiative filler 15 are mixed together in the resin composition 41, it is difficult for the resin composition 41 to transmit heat. Also, in cases in which the heat-radiative filler 15 is located inside the resin composition 41, the heat radiation hardly occurs.

Therefore, effects to suppress the temperature elevation of the heat-producing object 11 are small. This structure is a structure used in a comparative example which will be described below.

(Embodiment 2)

Figure 3:
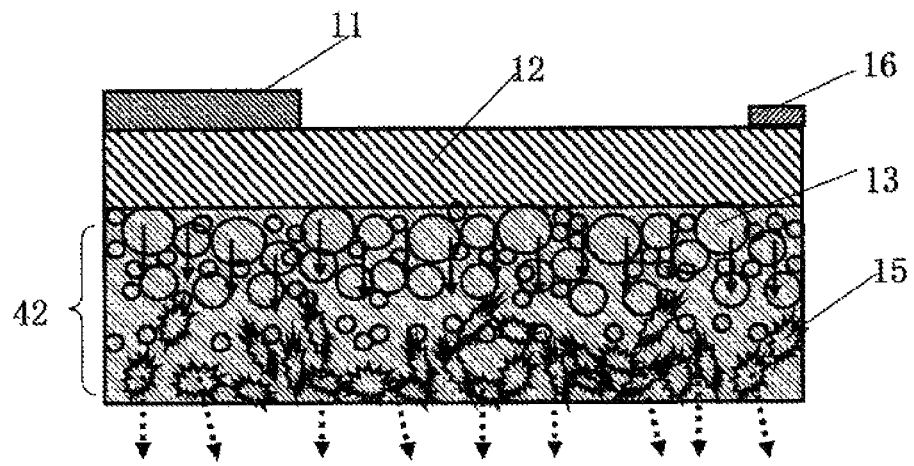
FIG. 3 is a cross-sectional view of an example of a coating structure in a configuration of Example 11.

FIG. 3 shows a structure of Embodiment 2. A resin composition 42 forms into one layer. However, the resin composition 42 has a structure having a filler architecture in which a proportion of a heat-conductive filler 13 in a portion of the resin composition 42 which is in contact with the substrate 12 is higher, while a proportion of a heat-radiative filler 15 in a portion of the resin composition 42 near its backside surface is higher, and each of the proportions of the fillers gradiently and gradually descends between both the portions, thus switching to one another.

As described above, the resin composition 42 is not produced with sheets, but is produced with a paste, and the concentration of each filler gradiently changes. Therefore, heat conductance and heat-radiative properties can efficiently be exerted.

That case is close to the structure showed in FIG. 1. Therefore, the temperature elevation can efficiently be suppressed. As to a process for producing a structure having gradient distributions of such types of fillers, any method can be adopted, and a method therefor is not particularly limited. For example, a method in which a high heat-conductive resin paste is coated, and then, a high heat-radiative resin paste is coated without curing the high heat-conductive resin paste, to thereby mixing the pastes in the boundary face, can be proposed.

(Embodiment 3)

Figure 4:
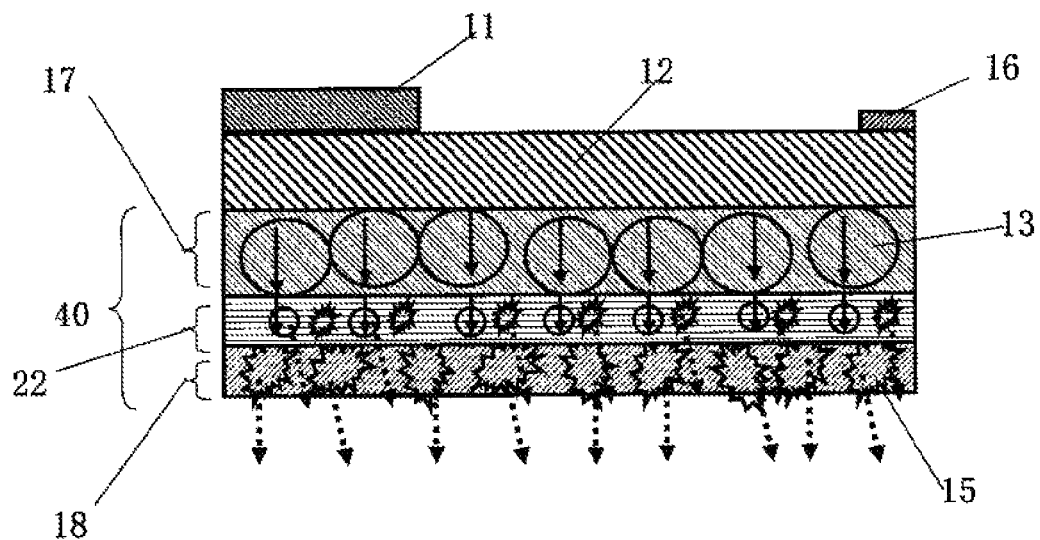
FIG. 4 is a cross-sectional view of an example of a coating structure in configurations of Examples 5 to 6.

FIG. 4 shows a structure of Embodiment 3. The structure of Embodiment 3 is a multi-layer structure in which an intermediate layer 22 is further added to the structure of FIG. 1. Although three layers are formed therein, yet another new intermediate layer 22 may be added. The intermediate layer 22 can include conductive particles such as of silver or copper, or conductive particles such as graphite powder. By including a resin paste containing a filler which combines a high heat conductivity and high heat-radiative properties among layers, as a whole, efficiencies of the heat conduction and the heat radiation can be increased while retaining insulating properties.

In addition, by including, as the intermediate layer 22, a filler, such as MgO, problems in moisture resistance among layers can be reduced, and reliability of the moisture resistance can be thereby improved, and the cooling structure can be made usable.

As the intermediate layer 22, a mixture of the heat conduction layer 17 and the heat radiation layer 18 can be used. Such a mixture has properties intermediate between the heat conduction layer 17 and the heat radiation layer 18, and also, its adhesiveness is caused from the same materials. Therefore, the mixture is favorable. In particular, properties of the heat conduction layer 17 and the heat radiation layer 18 continuously change, and therefore, the mixture is favorable.

In configurations shown in Embodiments 1 to 3, a heat conductivity λ of the heat conduction layer 17 is desirably 1.0 W/(m·K) or more. Further, the heat conductivity λ is more preferably 2.0 W/(m·K) or more. When the heat conductivity λ is smaller than 1.0 W/(m·K), the heat from the substrate 12 cannot be transmitted to the heat radiation layer, and therefore, effects to suppress the temperature elevation cannot be expected.

<Heat Conduction Layer 17>

In order to allow the heat conduction layer 17 to have a heat conductivity λ of 1.0 W/(m·K) or more, as a heat-conductive filler 13 included in the layer, silver, copper, graphite, silicon carbide, aluminum oxide, boron nitride, aluminum nitride and the like are preferred. In particular, since a heat conductivity of aluminum oxide (alumina) is as large as 32 W/m·K, excellent heat conductance can be exerted when 40 to 95 volt of alumina is added to the heat conduction layer 17. Specifically, when 90 wt % (73 vol %) of alumina is added thereto, a heat conductivity of the coating material can be increased to around 3 to 5 W/(m·K).

<Heat Radiation Layer 18>

It is required that an infrared emissivity ε of the heat radiation layer 18 is 0.7 or more. To achieve such an infrared emissivity, as a heat-radiative filler 15 included in the layer, ceramics such as zinc oxide, silicon oxide, magnesium oxide, titanium oxide and iron oxide; natural and artificial minerals such as corundum, cordierite, hydrotalcite, forsterite, steatite, kaolin and mullite; and the like are preferable.

As to the infrared emissivity ε, that of a black body is maximum, and is 1.0, and those of oxides are 0.7 or more. When the infrared emissivity ε is 0.7 or more, its heat-releasing effects will be exerted.

In particular, since the infrared emissivity of cordierite ($2MgO.2Al_2O_3.5SiO_2$) alone, which is an artificial mineral, is as large as 0.90 to 0.97 (wavelength: 6 μm), excellent heat-radiative properties are exerted when 30 to 70 vol % of cordierite is added to the heat-radiative coating material. Specifically, when 83.5 wt % (70 vol %) of cordierite is added thereto, the infrared emissivity of the heat-releasing resin paste can be increased to 0.95.

APPLICATION EXAMPLE 1

Figure 5:
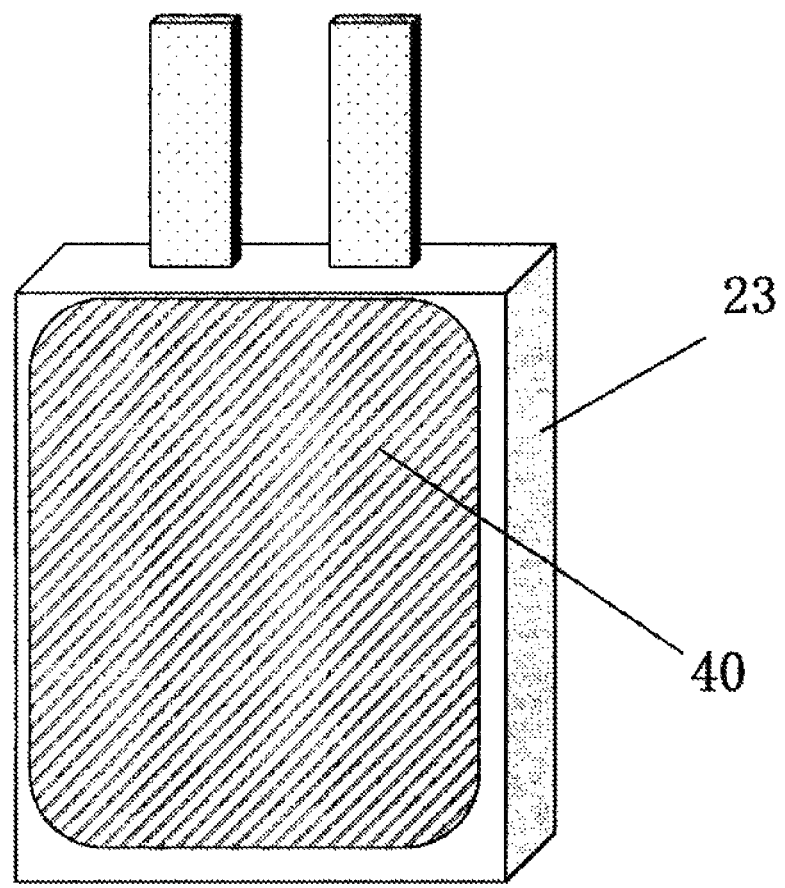
FIG. 5 is a view showing an application of a resin composition to a battery pack.

FIG. 5 and subsequent figures show examples of applications or purposes of the resin compositions 40, 42 according to various exemplary embodiments. FIG. 5 shows a heat-producing device 23 such as a lithium-ion battery or condenser which is packaged by lamination with an aluminum thin-film sheet multi-layer-coated with a thermoplastic film. FIG. 5 shows an appearance of the heat-producing device having a structure in which the resin composition 40 is formed on its surface.

A lithium-ion battery, a condenser and the like internally produce heat as they are driven. However, there is a tendency that their functions are deteriorated when their temperatures elevate. Therefore, in order to retain their functions, it is quite important to suppress their temperature elevation. Additionally, there are many cases where these heat-producing devices 23 are used in small mobile apparatuses such as portable phones, and, if a heat sink for heat release is used therein, they become bulky, and also, their weights will be increased. Therefore, an effective heat-releasing method has been sought.

When the resin composition 40 according to the various embodiments is included, the temperature elevation can be suppressed by heat radiation. Consequently, downsizing of a heat sink or omission of a heat sink also becomes possible, and therefore, use of the resin composition 40 can be a very effective means.

APPLICATION EXAMPLE 2

Figure 6:
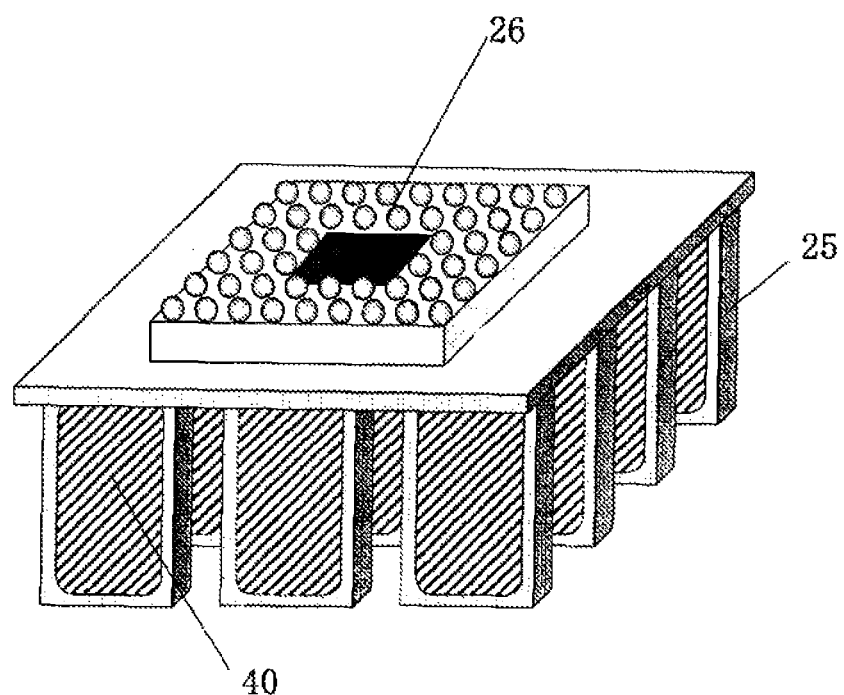
FIG. 6 is a view showing an application of a resin composition to a semiconductor package.

FIG. 6 shows a state in which release of heat from a semiconductor element 26 is carried out using heat sinks 25 onto which the resin composition 40 has been coated. The heat sinks 25 are cooling components which cause convection of the heat on their surfaces to release the heat to the air. When the resin composition 40 having excellent heat-radiative properties is coated onto their surfaces, the temperature elevation can be suppressed in two modes of convection and radiation, and therefore, such coating of the resin composition can be a more effective technique. Because a heat sink can be made small according to the technique, the technique is effective in terms of weight and bulk of the apparatus, and can further contribute to cost reduction.

APPLICATION EXAMPLE 3

Figure 7:
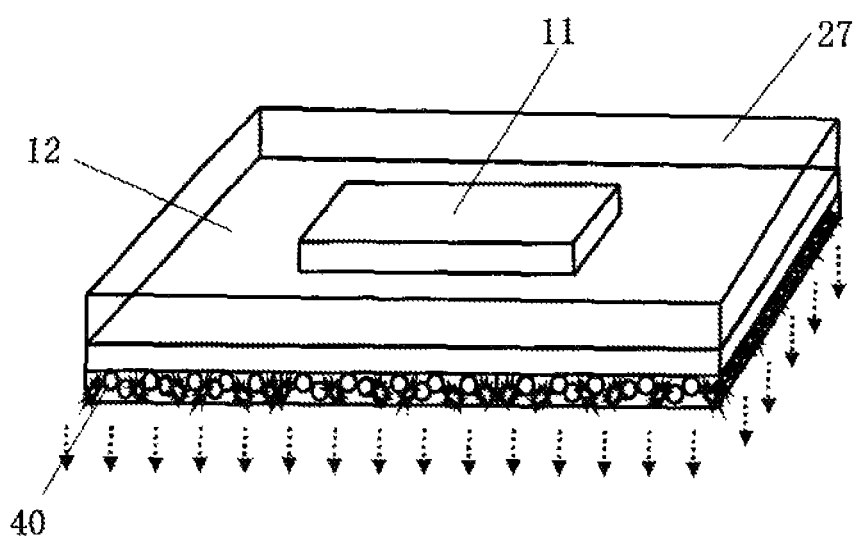
FIG. 7 is a view showing an application of a resin composition to a portable apparatus.

FIG. 7 shows a mobile apparatus, such as a personal computer, tablet or portable phone, which has an increase in internal temperature due to heat produced from a semiconductor element. The mobile apparatus has a structure in which heat generated in a heat-producing object 11 inside a case 27 is directed to the outside via heat conduction through a substrate 12 inside the case 27, thereby cooling the heat-producing object 11.

FIG. 7 shows a structure in which the resin composition 40 is formed on the outer surface of the substrate 12. Because the mobile apparatus requires downsizing/weight reduction, it is difficult to provide a space where a heat sink or fan is provided. However, both downsizing/weight reduction and suppression of the temperature elevation can simultaneously be achieved by adopting a heat-releasing technique based on infrared radiation as shown in FIG. 7.

APPLICATION EXAMPLE 4

Figure 8:
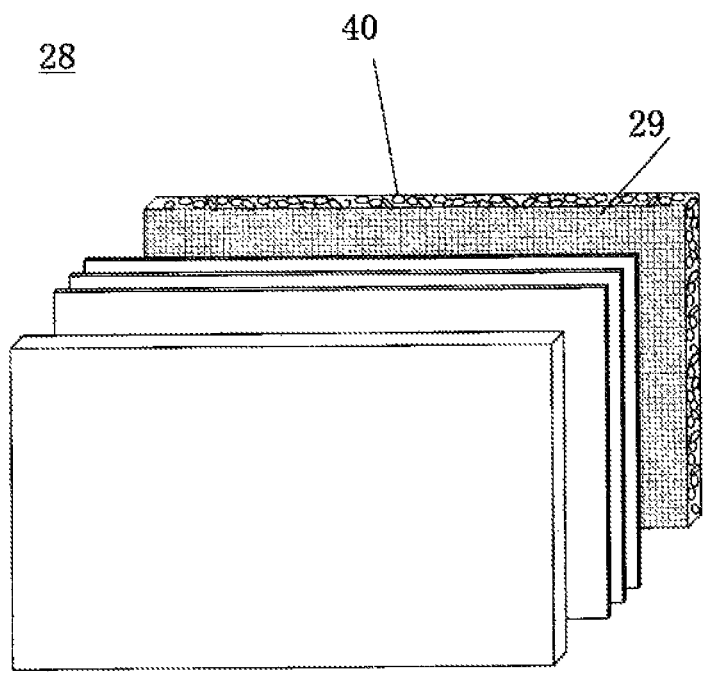
FIG. 8 is a view showing an application of a resin composition to a liquid crystal display.

FIG. 8 shows a configuration diagram of a liquid crystal display 28. From the surface, a liquid crystal panel, a polarizing plate, a glass substrate, a color filter, liquid crystals, a glass substrate and a backlight 29 are formed in that order, and high-intensity LED lamps are used for the backlight 29.

Because of an increase in the size and high brightness of the recent liquid crystal display 28, the backlight 29 tends to have a higher output. Therefore, the amount of heat generated therein is increasing, and an effective heat-releasing method has been sought. In general, a method of releasing the heat with a heat sink has been adopted. However, there are needs of cost reduction, etc., and, by providing the resin composition 40 on the back face of the backlight 29, the heat can efficiently be released therefrom.

APPLICATION EXAMPLE 5

Figure 9:
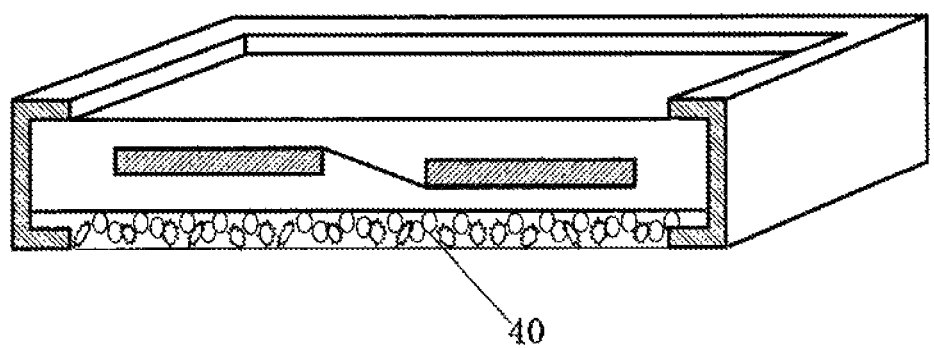
FIG. 9 is a cross-sectional perspective view showing an application of a resin composition to a solar battery.

FIG. 9 shows a cross-sectional view of a solar battery module 30. in general, cells are sealed with a filler such as EVA in the solar battery module 30. However, when the solar battery module 30 is mounted on a rooftop, there is a situation in which the temperature of the solar battery module increases due to summer sunlight, and the power generation efficiency is deteriorated. Therefore, by coating the resin composition 40 onto the backsheet present in the back of the solar battery module 30, the internal heat can be radiated, thereby suppressing the temperature elevation, and, consequently, deterioration of the power generation efficiency can be prevented.

<Examples>

Next, the coating structure according to the various exemplary embodiments will be specifically described with reference to examples. However, it should be noted that the coating structure is not limited to these embodiments. Particularly, the coating structure can be modified without departing from the spirit and scope as recited in the claims.

EXAMPLES

Heat conduction layer pastes, intermediate layer pastes, mixture pastes, heat radiation layer pastes, and soft pastes used in the following examples and comparative examples are shown in Table 1. As a binder resin, an epoxy resin and a curing agent were used. However, only for soft pastes, a silicone resin was used instead of an epoxy resin and a curing agent.

TABLE 1

| | | Paste Type | | | | | | |
|---|---|---|---|---|---|---|---|---|
| | | Heat conduction layer paste A | Heat conduction layer paste B | Heat conduction layer paste C | Heat conduction layer paste D | Intermediate layer paste A | Intermediate layer paste B | Mixture paste |
| Components (wt %) | Epoxy resin*1 | 28.1 | 3 | 10.3 | 12.4 | 22.2 | 17.1 | 17.7 |
| | Curing agent*2 | 3.1 | 0.3 | 1.2 | 1.4 | 2.5 | 1.8 | 1.9 |
| | Silicone resin*3 | | | | | | | |
| | SiC*4 | | | | 86.2 | | | |
| | Alumina (aluminum oxide)*5 | 68.8 | 96.7 | 88.5 | | | | 40.2 |
| | Graphite*6 | | | | | | 81.1 | |
| | MgO*7 | | | | | 75.3 | | |
| | Cordierite*8 | | | | | | | 40.2 |
| | Forsterite*9 | | | | | | | |
| | Steatite*10 | | | | | | | |
| | Total (parts by weight) | 100 | 100 | 100 | 100 | 100 | 100 | 100 |
| | Filler concentrations (wt %) | 68.8 | 96.7 | 88.5 | 86.2 | 75.3 | 81.1 | 80.4 |
| | Filler concentrations (vol %) | 40 | 90 | 70 | 70 | 50 | 70 | 60 |
| | Heat conductivity W/(m · K) | 2.5 | 4.2 | 4.0 | 4.6 | 3.2 | 5.5 | 2.2 |
| | Emissivity (—) | 0.40 | 0.45 | 0.45 | 0.65 | 0.93 | 0.8 | 0.65 |

| | | Paste Type | | | | | | |
|---|---|---|---|---|---|---|---|---|
| | | Heat radiation layer Paste A | Heat radiation layer Paste B | Heat radiation layer Paste C | Heat radiation layer Paste D | Heat radiation layer Paste E | Soft paste A | Soft paste B |
| Components (wt %) | Epoxy resin*1 | 46.7 | 14.9 | 28.4 | 22.9 | 27.7 | | |
| | Curing agent*2 | 5.2 | 1.6 | 3.2 | 2.6 | 3.1 | | |
| | Silicone resin*3 | | | | | | 11.5 | 31.6 |
| | SiC*4 | | | | | | | |
| | Alumina (aluminum oxide)*5 | | | | | | 88.5 | |
| | Graphite*6 | | | | | | | |
| | MgO*7 | | | | | | | |
| | Cordierite*8 | 48.1 | 83.5 | 68.4 | | | | 68.4 |

TABLE 1-continued

|  | | | | | | | |
|---|---|---|---|---|---|---|---|
| Forsterite*9 | | | | | 74.5 | | |
| Steatite*10 | | | | | | 69.2 | |
| Total (parts by weight) | 100 | 100 | 100 | 100 | 100 | 100 | 100 |
| Filler concentrations (wt %) | 48.1 | 83.5 | 68.4 | 74.5 | 69.2 | 88.5 | 68.4 |
| Filler concentrations (vol %) | 30 | 70 | 50 | 50 | 50 | 70 | 50 |
| Heat conductivity W/(m · K) | 0.7 | 1.8 | 1.5 | 1.5 | 1.6 | 3.3 | 1.3 |
| Emissivity (—) | 0.85 | 0.94 | 0.92 | 0.85 | 0.85 | 0.44 | 0.90 |

*1an epoxy resin: liquid bisphenol F type epoxy "YDF8170" (manufactured by NIPPON STEEL & SUMIKIN CHEMICAL CO., LTD, epoxy equivalent: 160).
*2an (epoxy) curing agent: An imidazole "2P4MHZ" (2-phenyl-4-methyl-5-hydroxymethyl imidazole) manufactured by SHIKOKU CHEMICALS CORPORATION was used. In addition, various types of inorganic fillers shown below were used. These were weighed at ratios described in Table 1, and were kneaded with a planetary mixer, thereby preparing 12 types of resin pastes.
*3a silicone resin: an addition reaction-type silicone "YE5818" (manufactured by Momentive Performance Materials Inc.). This silicone resin was used, and various types of inorganic fillers shown below were used. These were weighed at proportions described in Table 1, and were kneaded with a planetary mixer, thereby preparing 2 types of resin pastes (soft pastes A and B).
*4SiC "500H2" (mean particle size: 26 μm) manufactured by Pacific Rundum Co., Ltd.
*5alumina (aluminum oxide) "DAW07" (mean particle size: 8 μm) manufactured by DENKA.
*6graphite (mean particle size: 20 μm) manufactured by Panasonic Corporation.
*7MgO "SL-WR" (mean particle size: 10 μm) manufactured by Konoshima Chemical Co., Ltd.
*8cordierite (2MgO•2Al$_2$O$_3$•5SiO$_2$) "SS100" (mean particle size: 18 μm) manufactured by MARUSU GLAZE Co., Ltd.
*9forsterite (2MgO•SiO$_2$) "FF200" (mean particle size: 3 μm) manufactured by MARUSU GLAZE Co., Ltd.
*10steatite (MgO•SiO$_2$) "SB12S" (mean particle size: 8 μm) manufactured by MARUSU GLAZE Co., Ltd.

Subsequently, samples of resin compositions were prepared with these pastes in conditions shown in Table 2.

In Table 2, structures are each shown by the numbers of figures. In addition, pastes used therein and temperature differences of evaluation results are shown in Table 2.

TABLE 2

| | | Example 1 | Example 2 | Example 3 | Example 4 | Example 5 | Example 6 | Example 7 |
|---|---|---|---|---|---|---|---|---|
| Paste type | Heat conduction layer 7 | Heat conduction layer paste A | Heat conduction layer paste B | Heat conduction layer paste C | Heat conduction layer paste D | Heat conduction layer paste D | Heat conduction layer paste C | Heat conduction layer paste C |
| | Heat conduction layer 8 | Heat radiation layer paste C | Heat radiation layer paste C | Heat radiation layer paste C | Heat radiation layer paste C | Heat radiation layer paste C | Heat radiation layer paste C | Heat radiation layer paste A |
| | Intermediate layer | | | | | Intermediate layer paste A | Intermediate layer paste B | |
| Structures of prepared samples | Corresponding figure | FIG. 1 | FIG. 1 | FIG. 1 | FIG. 1 | FIG. 4 | FIG. 4 | FIG. 1 |
| Temperature elevation-suppressing temperature ΔT | Temperature difference (° C.) | 21 | 34 | 28 | 33 | 35 | 36 | 23 |
| | Temperature elevation-suppressing ratio (%) | 17.5 | 28.3 | 23.3 | 27.5 | 29.2 | 30.0 | 19.2 |
| | Determination | Fair | Good | Good | Good | Good | Excellent | Good |
| Scratch resistance | | Good | Good | Good | Good | Good | Good | Good |
| Overall determination | | Fair | Good | Good | Good | Good | Excellent | Good |

| | | Example 8 | Example 9 | Example 10 | Example 11 | Comparative Example 1 | Comparative Example 2 | Comparative Example 3 |
|---|---|---|---|---|---|---|---|---|
| Paste type | Heat conduction layer 7 | Heat conduction layer paste C | Heat conduction layer paste C | Heat conduction layer paste C | Heat conduction layer paste A | (None) | Mixture paste | Soft paste A |
| | Heat conduction layer 8 | Heat radiation layer paste B | Heat radiation layer paste D | Heat radiation layer paste E | Heat radiation layer paste A | | | Soft paste B |
| | Intermediate layer | | | | | | | |
| Structures of prepared samples | Corresponding figure | FIG. 1 | FIG. 1 | FIG. 1 | FIG. 3 | No resin layer in FIG. 1 | FIG. 2 | FIG. 1 |
| Temperature elevation-suppressing temperature ΔT | Temperature difference (° C.) | 41 | 28 | 30 | 18 | 5 | 11 | 23 |
| | Temperature elevation-suppressing ratio (%) | 34.2 | 23.3 | 25.0 | 16.0 | 4.2 | 9.2 | 19.2 |
| | Determination | Excellent | Good | Good | Fair | Poor | Poor | Fair |
| Scratch resistance | | Excellent | Good | Good | Good | | Good | Poor |
| Overall determination | | Excellent | Good | Good | Fair | Poor | Poor | Poor |

Example 1

An example in which the resin composition 40 of FIG. 1 was prepared is shown. An aluminum substrate of 40 mm×100 mm×1 mm thick was prepared. Then, in accordance with conditions of Example 1 shown in Table 2, the heat conduction layer paste A was coated onto the back face of the substrate 12, where a heat-producing object 11 was mounted, with a metal mask.

As to the coating thickness, the heat conduction layer paste A was coated at a thickness of 200 μm. The coated product was tentatively cured at 120° C. for 10 minutes. Further, after cooling the product, the heat radiation layer paste C was coated thereon at a thickness of 100 μm with a metal mask, and then, the product was thermally cured at 120° C. for 30 minutes, thereby producing the resin composition 40 of Example 1. In addition, if the thickness of the heat radiation layer 18 is larger, release of infrared rays are intercepted. Therefore, thin and uniform coating is preferable.

In the stage of tentative curing at 120° C. for 10 minutes, curing of the resin in the heat conduction layer paste had not yet been completed, and reactive groups had still remained in the resin. Consequently, reactions of the reactive groups with the heat radiation layer paste proceeded, and therefore, a boundary was not formed between the two types of resin pastes, and their strong connection became possible.

In addition, as a new discovery, it was discovered that the fillers in the heat conduction layer paste sunk downward (to the substrate side) when the resin viscosity decreased by heating during curing for 120° C. for 10 minutes. When looking at the cross-section, it was revealed that large filler particles sufficiently sunk downward, and that, according to this, effects to further promote the heat conduction could be obtained.

A ceramic heater (heat-producing object 11) of 10 mm×10 mm was mounted on a central, portion of the back face of the resin composition 40 with a silicone heat-releasing grease (G777, Shin-Etsu silicone). In addition, a chromel-alumel thermocouple 16 was fixed at the end with a heat-resistant tape.

Examples 2 to 4

For production of resin compositions 40 according to Examples 2, 3 and 4, pastes shown in Table 2 were used in the same steps of Example 1.

Examples 5 to 6

Resin compositions 40 having the structure shown in FIG. 4 were produced in Examples 5 and 6. In Example 5, as a paste for the heat conduction layer 17, the heat conduction layer paste D was first coated onto the entire face of the substrate 12 at a thickness of 100 μm with a metal mask, and the coated paste was tentatively cured at 120° C. for 10 minutes. After cooling the substrate, as an intermediate layer 22, the intermediate layer paste A was coated thereon at a thickness of 100 μm with a metal mask, and the coated paste was thermally cured at 120° C. for 10 minutes. After cooling the product, as a heat radiation layer 18, the heat radiation layer paste C was coated thereon at a thickness of 100 μm with a metal mask, and the coated paste was thermally cured at 120° C. for 30 minutes, thereby producing an element for evaluation on heat-releasing properties having the three-layer structure shown in FIG. 4. As to production of an element for evaluation on heat-releasing properties of Example 6, an element for evaluation on heat-releasing properties having the structure of FIG. 4 was produced with the pastes shown in Table 2 in the same manner.

Examples 7 to 10

In the same steps as Example 1, elements for evaluation on heat-releasing properties were produced by repeating coating/curing of the resin pastes shown in Table 2 for the heat conduction layer 17 and the heat radiation layer 18.

Example 11

As to production of a coating structure according to Example 11, an element for evaluation on heat-releasing properties having the structure shown in FIG. 3 was produced. As a paste for the heat conduction layer 17, the heat conduction layer paste A was first coated onto the entire face of the substrate at a thickness of 100 μm with a metal mask, and, as the heat radiation layer 18, the heat radiation layer paste A was further coated thereon at a thickness of 100 μm with a metal mask without curing the coated heat conduction layer paste A. The coated pastes were thermally cured at 120° C. for 30 minutes, thereby producing an element for evaluation on heat-releasing properties of Example 11. The heat conduction layer paste A and the heat radiation layer paste A used in production of Example 11 had low filler proportions and low viscosities, and easily move. Furthermore, the resin paste for the heat radiation layer 18 was coated thereon without curing the coated heat conduction layer paste A, and therefore, the two resin pastes spontaneously mixed together in the boundary face, and a mixing structure as shown in FIG. 3 could be formed.

Comparative Example 1

In Comparative Example 1, the resin composition 40 was omitted in FIG. 1, and only a heater and a thermocouple were attached thereto, thereby producing an element for evaluation on heat-releasing properties of Comparative Example 1.

Comparative Example 2

As to production of a resin composition 40 according to Comparative Example 2, in the structure of FIG. 2, the mixture paste in Table 1 was coated onto the entire face of the substrate at a thickness of 200 μm with a metal mask, and the coated paste was thermally cured at 120° C. for 30 minutes, thereby producing an element for evaluation on heat-releasing properties of Comparative Example 2.

Comparative Example 3

As to production of a resin composition 40 according to Comparative Example 3, in the structure of FIG. 1, the soft pastes A and B in Table 1 were coated onto the entire face of the substrate at a thickness of 200 μm with a metal mask, and the coated pastes were thermally cured at 120° C. for 30 minutes, thereby producing an element for evaluation on heat-releasing properties of Comparative Example 3.

<Method of Evaluating Pastes>

With respect to 14 types of resin pastes shown in Table 1, measurements of heat conductivities and emissivities were carried out.

(1) Heat Conductivity

A paste was printed on a releasing film at a thickness of 200 μm with a metal mask, and the printed paste was thermally cured at 120° C. for 30 minutes, thereby producing a heat-releasing resin sheet. The sheet was cut at a size of 10 mm×10 mm×0.5 mm, and the heat conductivity was measured by an ordinary method (i.e. the test piece was set between a heat-producing object and a heat sink, and the heat conductivity was calculated from a temperature difference upon the temperature elevation).

(2) Emissivity

Figure 10:
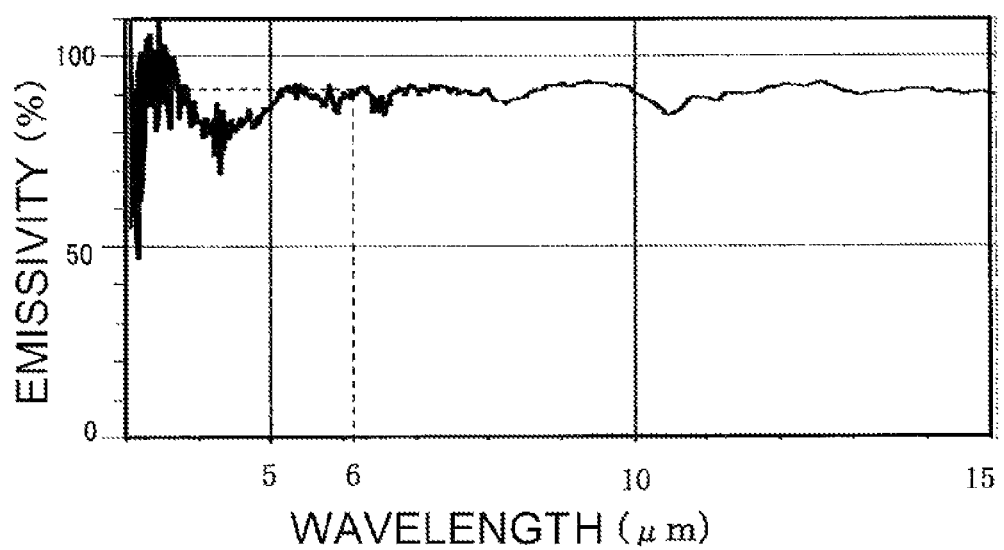
FIG. 10 is a graph of results of infrared emissivity measurement.

The heat-releasing resin sheet produced in the step of above (1) was cut into a 25 mm square, and this piece was adhered to a copper plate of the same size. The sample was set in an FT-IR measurement apparatus (IRPrestige-21, Shimadzu Corporation), the temperature of the sample was increased to 120° C., and then, the infrared emissivity was measured in a blackbody furnace mode. The results are shown in FIG. 10.

A value at a far-infrared region wavelength of 6 μm was defined as an infrared emissivity. Additionally, even at a wavelength of 6 μm or more, the value was almost constant.

<Method of Evaluating a Resin Composition 40>

Samples of examples and comparative examples in Table 2 were evaluated. Each of evaluation methods is described below.

(1) Temperature Elevation-Suppressing Temperature (ΔT)

Resin compositions 40 were set as shown in FIGS. 1 to 4. An aluminum substrate of 40 mm×100 mm×mm was used. A ceramic heater (heat-producing object 11) of 10 mm×10 mm was mounted thereon with a silicone heat-releasing grease (G777, Shin-Etsu Silicone). In addition, a chromel-alumel thermocouple 16 (FIGS. 1 to 4) was fixed to the opposite end part with a heat-resistant tape. The measurement substrate was set in a thermostatic chamber which had been maintained at 20° C., and a current was applied to the ceramic heater in a windless state. While increasing the voltage, the temperature of the thermocouple when the heater temperature reached 120° C. was measured, and following Formula 2 was used.

$$\Delta T = [120° \text{ C.} - \text{the temperature of the thermocouple}] \quad \text{(Formula 2)}$$

As shown in Example 1, when the heat conduction layer paste A including 40 vol % of alumina (aluminum oxide) was used for the heat conduction layer 17, and the heat radiation layer paste C including 50 vol % of cordierite was used for the heat radiation layer 18, the temperature elevation-suppressing temperature (ΔT) at 120° C. was 21° C. Meanwhile, with respect to Comparative Example 1 without a resin paste (blank), the heat elevation-suppressing temperature (ΔT) in the same conditions was just 5° C. Therefore, when comparing the two results, the temperature difference ΔT of the resin pastes=16° C. The temperature elevation-suppressing ratio corresponds to a ratio obtained by dividing the value by 120° C. In the case of Example 1, 16/120×100=17.59.

Here, a case where the temperature elevation-suppressing rate was less than 10% was determined as "poor"; a case where the temperature elevation-suppressing rate was 10% or more was determined as "fair"; a case where the temperature elevation-suppressing rate was 20% or more was determined as "good"; and a case where the temperature elevation-suppressing rate was 30% or more was determined as "excellent." Although it is preferable that the temperature elevation-suppressing rate was larger, it was considered that cases where the rates were 10% or more were in an acceptable range. Furthermore, cases where the temperature elevation-suppressing rates were smaller than 10%, such case cannot be considered as effective means in consideration of costs for past coating, etc., although it depends on purposes.

In addition, since this measurement was carried out in conditions where convection (heat transmission through solids and gases) was negligible, heat from the heater (heat-producing object 11) transmitted from the substrate 12 to the resin composition 40 by heat conduction, and the heat efficiently conducted from the boundary of the substrate 12 to the resin composition 40, and an energy was released outward from the surface of the resin composition 40 in a form of infrared rays by heat radiation, thereby achieving heat release. Therefore, it is deduced that, for that reason, the temperature of the end part of the substrate 12 decreased.

(2) Scratch Resistance (Scratch Properties)

Resin compositions 40 were evaluated along with scratch hardness (pencil method) of JIS K 5600-5-4. Determination was carried out based on, pencil hardness of soft to hard, i.e. standards where [B or lower] is soft (poor); [HB] is slightly soft (fair); [F] is slightly hard (good); and [H or higher] is hard (Excellent). For assembling of components, implementation, transportation of components, etc., at least HB or higher is required. When the hardness is less than HB, cracks or the like will occur.

<Overall Determination>

The overall determination was carried out based on the temperature elevation-suppressing rate of ΔT and the scratch resistance. When either one of the criteria was poor, the case was determined as poor. When both the criteria were not poor but either one was fair, the case was determined as fair. When both the criteria were good, the case was determined as good. When both the criteria were not poor and fair, and either one was excellent, the case was determined as excellent.

Because the same levels of both the properties were required, determination was carried out in the above-described way.

<Observation>

As shown in Examples 2 to 3, it was revealed that, when alumina proportions in the alumina (aluminum oxide)-containing resin pastes used for the heat conduction layer 17 were higher, the heat-releasing properties were superior.

As shown in Example 4, it was revealed that, when SiC, which had a high heat conductivity, was used for a filler of a paste used for the heat conduction layer 17, the heat-releasing properties were superior.

As shown in Examples 5 to 6, it was revealed that, when a three-layer structure was adopted, and graphite and MgO having high heat conductivities and emissivities were used for the intermediate layer 22, the heat-releasing properties were superior.

As shown in Examples 7 to 8, it was revealed that, in a case where cordierite having high heat-radiative properties was used for the heat radiation layer 18, the heat-releasing properties were superior when its content ratio was high.

As shown in Examples 9 to 10, it was revealed that, also when forsterite or steatite having a high infrared emissivity was used as a filler used for the heat radiation layer 18, the heat-releasing properties were superior.

As seen from Example 11, it was revealed that, when the heat-conductive filler 13 and the heat-radiative filler 15 mixed together in the boundary in a structure where the resin pastes for the heat conduction layer 17 and the heat radiation layer 18 mixed together in their boundary, the heat-releasing properties were superior.

From Comparative Example 1, it was revealed that the properties were not at all exerted when no resin layers were present.

From Comparative Example 2, it was revealed that, when the heat-conductive filler 13 and the heat-radiative filler 15 were uniformly dispersed in the whole resin composition 40, the temperature-reducing effects were small.

In Comparative Example 3, a silicone resin, which was a soft resin, was formed into two layers, and therefore, a problem was observed in the scratch resistance.

Based on comparison of the heat conduction layer paste A and the soft paste B with other pastes, the heat conductivity λ is preferably 1.3 W/(m·K) or more, more preferably 2.5 W/(m·K) or more.

Based on comparison of the heat radiation layer pastes A to D with the mixture paste, when the infrared emissivity ε is 0.7 or more, the paste was used as a paste for the heat radiation layer 18.

<Heat-Conductive Filler 13>

In order to increase the heat conductivity λ, it is required that alumina (aluminum oxide) is highly filled into the heat-conductive filler 13. In order to increase the heat conductivity λ to 1 W/m·K or more, in a case of alumina of 32 W/m·K, 40vol % (68.8 wt %) thereof is required, based on the composition (Table 1) of the heat conduction layer pastes A to C used in Examples 1 to 3.

When an amount of alumina higher than the above amount is included therein, the heat conductivity will be increased. However, the filler proportion in the heat conduction layer paste becomes high, and the viscosity of the heat conduction layer-forming paste becomes high. Consequently, its handleability becomes inferior. By using a low viscosity resin as the resin used for the heat conduction layer paste or by using a diluent or solvent, an increase in the viscosity can be suppressed.

However, even in such a case, 95 volt is a limit at a maximum. Therefore, 40 to 95 vol % of alumina (aluminum oxide) is used in the heat conduction layer paste. 40 to 70 vol % thereof is more preferably used.

<Heat-Radiative Filler 15>

In order to increase the infrared emissivity ε, it is also required that a heat-radiative filler 15 having a high infrared emissivity is included in the infrared radiation paste. With regard to the infrared emissivity, the infrared emissivity of the resin alone is about 0.5, and therefore, it is unnecessary to include an amount of the heat-radiative filler 15 as high as the filler for the heat conductivity. Although the amount of the heat-radiative filler 15 depends on a type of the filler, based on compositions of the heat radiation layer pastes A to E used in Example 1 to 11 (Table 1), 30 vol % (48.1 wt %) or more of the filler is required, in order to achieve an infrared emissivity ε of 0.85 or more. In addition, when the filler proportion is increased, the paste viscosity increases in the same manner as the case of the filler for the heat conductivity. Therefore, it is required that the amount of the filler be 30 to 95 vol % or less. The mount of the filler is more preferably 40 to 70 vol %.

In addition, the thickness of the heat conduction layer 17 was homogenous in the above-described examples. However, the thickness may be varied. As to the coating thickness, it is more preferable that the paste is coated onto a portion near the heat-producing object 11 (the bottom part of the heat-producing object 11) at a thickness of 200 μm, and the paste be coated onto the endmost portions at a thickness of 100 μm such that the coating thickness gradually becomes smaller from the portion near the heat-producing object 11 to the peripheral portions. The amount of heat diffusion depends on the thickness of the heat conduction layer 17, and therefore, it is preferable that the thickness is larger near the heat-producing object 11 while the thickness is smaller around the peripheral portions. By forming a gradient of the thickness, the heat from the heat-producing object 11 can efficiently be diffused to the entire coating area. In the above, the imidazole curing agents are used. However, an other anion polymerization type curing agent can be also used likewise. The anion polymerization type curing agents include a tertiary amine compound, an imidazole compound and those denaturing articles. The tertiary amine compound indicates a compound having the third amino group in one molecule and, for example, includes benzyl dimethyl amine, tri ethanol amine etc. The imidazole compound includes 2-methyl imidazole, 2-ethyl-4-methyl imidazole, 2-undecyl imidazole, 2-phenyl-four or five-dihydroxymethyl imidazole, 2-phenyl-4-methyl-5-hydroxymethyl imidazole, i-benzyl-2-ethyl-imidazole. The anion polymerization type curing agent is superior in the reactivity with the epoxy resin and is superior in long-term preservation characteristics.

In addition, because the anion polymerization type curing agent has structure having high polarity, and the cured material which reacted with epoxy resin has high adhesion. As a result, the anion polymerization type curing agent has the joining reliability with the adherend.

By forming a coating structure according to the embodiments which has a layer having a heat conductivity λ of 1.0 W/(m·K) or more in a portion near the substrate which transmits heat from a heat-producing object and which has a layer having an infrared emissivity ε of 0.7 or more in a portion near the surface, energy from the heat-producing object can efficiently be reduced, and the heat elevation can be suppressed, thereby contributing to downsizing and weight reduction of electronic apparatuses.

What is claimed is:

1. A cooling structure, comprising:
a heat conduction layer including a first paste coated on a surface of a heat-producing object; and
a heat radiation layer including a second paste coated on a surface of the heat conduction layer, wherein
the heat conduction layer comprises a first resin and a first filler, and a heat conductivity λ of the heat conduction layer is 1.0 W/(m·K) or more, and
the heat radiation layer comprises a second resin and a second filler, and an infrared emissivity ε of the heat radiation layer is 0.7 or more.

2. The cooling structure according to claim 1, wherein the first resin comprises a liquid resin, an anion polymerization type curing agent, the first filler comprises aluminum oxide, and a proportion of the aluminum oxide is 40 vol % or more to the heat conduction layer.

3. The cooling structure according to claim 1, wherein the second resin comprises a liquid resin, an anion polymerization type curing agent, the second filler comprises cordierite, and a proportion of the cordierite is 30 vol % or more to the heat radiation layer.

4. The cooling structure according to claim 1, wherein the first or second resin comprises a liquid epoxy resin and an anion polymerization type curing agent.

5. The cooling structure according to claim 1, further comprising an intermediate layer between the heat conduction layer and the heat radiation layer, wherein the intermediate layer comprises a third resin and a third filler, and the third filler comprises the same type of the first filler and the second filler.

6. The cooling structure according to claim 1, further comprising an intermediate layer between the heat conduction layer and the heat radiation layer, wherein the intermediate layer comprises a third resin and a third filler, and the third filler does not comprise the same type of the first filler and the second filler.

7. The cooling structure according to claim 6, wherein the third resin comprises a liquid epoxy resin and an anion polymerization type curing agent.

8. The cooling structure according to claim 1, wherein the heat radiation layer has a hardness of HB or higher based on the scratch hardness (the pencil method).

9. The cooling structure according to claim 1, wherein the heat-producing object is a heat sink.

10. The cooling structure according to claim 1, wherein the heat-producing object is a battery.

11. The cooling structure according to claim 1, wherein the heat-producing object is a case for a portable apparatus.

12. The cooling structure according to claim 1, wherein the heat-producing object is a backlight.

13. A cooling structure comprising:
a heat-conduction heat-radiation layer, which is formed with a paste, on a surface of a heat-producing object, wherein
a larger amount of a first heat-conductive filler is located in a surface of the heat-conduction heat-radiation layer, which comes into contact with the heat-producing object, than in an interior of the heat-conduction heat-radiation layer, and a concentration of the first heat-conductive filler gradiently decreases from the surface to the interior of the heat-conduction heat-radiation layer, and
a larger amount of a second heat-radiative filler is located in an opposite face of the heat-conduction heat-radiation layer to the surface of the heat-producing object, than in an interior of the heat-conduction heat-radiation layer, and a concentration of the second heat-radiative filler gradiently decreases from the opposite face to the interior of the heat-conduction heat-radiation layer.

14. The cooling structure according to claim 13, wherein the heat-producing object is a heat sink.

15. The cooling structure according to claim 13, wherein the heat-producing object is a battery.

16. The cooling structure according to claim 13, wherein the heat-producing object is a case for a portable apparatus.

17. The cooling structure according to claim 13, wherein the heat-producing object is a backlight.

* * * * *